United States Patent [19]
Stokes et al.

[11] 3,881,904
[45] May 6, 1975

[54] METHOD OF JOINING A PAIR OF SILICON NITRIDE PARTS

[75] Inventors: Roger Francis Stokes, Birmingham; Brian John Hunt, Solihull, both of England

[73] Assignee: Joseph Lucas (Industries) Limited, Birmingham, England

[22] Filed: Feb. 13, 1974

[21] Appl. No.: 441,994

Related U.S. Application Data

[62] Division of Ser. No. 234,620, March 14, 1970.

[30] Foreign Application Priority Data
Mar. 24, 1971 United Kingdom.............. 7874/71
May 21, 1971 United Kingdom............ 16452/71

[52] U.S. Cl. .................... 65/43; 65/46; 423/344
[51] Int. Cl. ............................................. C03c 27/00
[58] Field of Search ............... 65/43, 36, 45, 374; 423/344

[56] References Cited
UNITED STATES PATENTS

| 2,750,268 | 6/1956 | Lewiston et al. ............... 423/344 X |
| 3,334,974 | 8/1967 | Fletcher et al. ................. 423/344 X |
| 3,367,696 | 2/1968 | Langley ................... 65/59 X |
| 3,681,044 | 8/1972 | Ruszczyk et al. ................. 65/43 X |

*Primary Examiner*—Robert L. Lindsay, Jr.
*Attorney, Agent, or Firm*—Holman & Stern

[57] ABSTRACT

To join a pair of silicon nitride parts, a powdered glass consisting of silica, alumina and an alkaline earth metal oxide is provided on at least one of the parts to be joined. The powdered glass is then heated so as to produce molten glass between the parts whereby, on cooling, the glass provides a joint between the parts.

4 Claims, 1 Drawing Figure

3,881,904
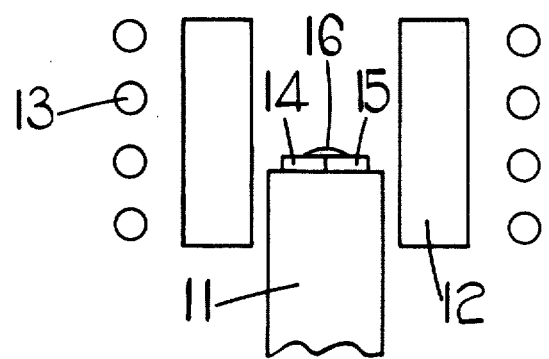

METHOD OF JOINING A PAIR OF SILICON NITRIDE PARTS

This invention relates to a method of joining a pair of silicon nitride parts and is a divisional application from our copending application No. 234620 filed Mar. 14, 1972.

A method, according to the invention, comprises the steps of:
  a. providing on at least one of the parts to be joined a powdered glass consisting of silica, alumina and an alkaline earth metal oxide, and
  b. heating the powdered glass so as to produce molten glass between the parts whereby, on cooling, the glass provides a joint between the parts.

When the alkaline earth metal oxide is magnesium oxide, the composition of the glass by weight lies within the following range:

| | | | |
|---|---|---|---|
| Silica | 50% | – | 80% |
| Alumina | 10% | – | 40% |
| Magnesium oxide | 10% | – | 25% |

When the oxide is calcium oxide, the composition of the glass by weight lies within the following range:

| | | | |
|---|---|---|---|
| Silica | 15% | – | 63% |
| Alumina | 11% | – | 53% |
| Calcium oxide | 11% | – | 50% |

When the oxide is strontium oxide, the composition of the glass by weight lies within the following range:

| | | | |
|---|---|---|---|
| Silica | 27% | – | 50% |
| Alumina | 5% | – | 38% |
| Strontium oxide | 25% | – | 70% |

When the oxide is barium oxide, the composition of the glass by weight lies within the following range:

| | | | |
|---|---|---|---|
| Silica | 18% | – | 50% |
| Alumina | 10% | – | 37% |
| Barium oxide | 30% | – | 65% |

Preferably, the heating step (b) is carried out in an atmosphere inert to the silicon nitride parts.

Conveniently, the powdered glass is provided between the parts to be joined and the parts are pressed together during the heating step (b) and the subsequent cooling of the molten glass.

The accompanying drawing illustrates schematically apparatus suitable for use in performing a method according to one example of the invention.

Referring to the drawing, in the example shown two hot pressed silicon nitride parts 14, 15 are to be joined together and are initially ground along the two edges to be joined to produce a surface finish better than 30 micro inches on the respective edge surfaces. The silicon nitride parts are then placed in edge-to-edge contact on a graphite pedestal 11 which is positioned within a susceptor 12 forming part of a furnace heated by an induction coil 13 which conveniently is water cooled.

Powdered glass 16 is placed on the parts 14 and 15 and the furnace is then evacuated and filled with pure nitrogen. The pedestal 11 is then heated by current flowing through the coil 13, so that the parts 14, 15 are heated to a temperature above the melting point of the glass 16, which flows into the crack defined between the parts 14, 15 and, on cooling, provides the required joint between the parts.

One glass which has proved to be suitable in the above method is formed by fusing at 1550°C a mixture consisting of 51.4% silica, 34.9% alumina and 13.7% magnesium oxide, all by weight, the fused mixture then being pulverised to produce the required powdered glass. In producing the joint between the silicon nitride parts 14, 15 using this particular glass, the parts are heated to a temperature of 1600°C on the pedestal 11. Other glasses of silica, alumina and magnesium oxide which have been found to be suitable have the following composition by weight:
  SILICA between 50% and 80%
  ALUMINA between 10% and 40%
  MAGNESIUM OXIDE between 10% and 25%

Of course, all the glasses within the above range of glass compositions have different melting points, but in each case the glass is produced by heating the components at the melting point of the particular glass and then grinding the fused mixture to provide the required powder. Also, in each case the glass powder when provided on the parts 14, 15 is, in effecting a joint between the parts, heated to a temperature above its melting point. Thus, a glass mixture consisting of 64% by weight silica, 10% by weight alumina and 26% by weight of magnesium oxide has a melting point of 1470°C and is heated to about 1670°C in forming the joint between the parts 14, 15. Another glass consisting of 62.0% by weight of silica, 17.0% by weight of alumina and 21.0% of magnesium oxide has a melting point of 1355°C and is heated to 1500°C during the joining operation. A further glass consisting of 66% by weight of silica, 5% by weight of alumina and 29% by weight of magnesium oxide has a melting point of 1500°C and is heated to 1700°C to join the parts 14, 15.

In another glass formulation which has proved to be suitable for joining the parts 14, 15 calcium oxide replaces the magnesium oxide used above. Suitable compositions for this other glass are:
  SILICA between 15 and 63% by weight
  ALUMINA between 11 and 53% by weight
  CALCIUM OXIDE between 11 and 50% by weight.
  The preferred composition for this other glass is 60% by weight silica, 15% by weight alumina and 25% by weight calcium oxide.

The other alkaline earth oxides, that is strontium oxide and barium oxide, have also been found to produce glasses with silica and alumina which are suitable for joining the parts 14, 15. The range of compositions for these additional glasses which have been found to give satisfactory results are as follows:
  SILICA between 27 and 50% by weight
  ALUMINA between 5 and 38% by weight
  STRONTIUM OXIDE between 25 and 70% by weight and,
  SILICA between 18 and 50% by weight
  ALUMINA between 10 and 37% by weight
  BARIUM OXIDE between 30 and 65% by weight.

In the case of the strontium oxide glass, the preferred composition is 41% by weight silica, 14% by weight alumina and 45% by weight strontium oxide, whereas for the barium oxide glass the preferred composition is 25% by weight silica, 10% by weight alumina and 65% by weight barium oxide.

In addition to the joining of hot pressed silicon nitride parts, each of the above glasses have been found to be suitable for joining a pair of reaction bonded silicon nitride parts and for joining a reaction bonded part to a hot pressed part.

In a modification (not shown) of the above example, the glass powder is made into a paste with water and is applied to the region of one of the parts which is to be joined to the other part so as to produce a coating about 1 m.m. thick on the one part, care being taken to avoid trapped air in the coating. The parts are then assembled together so that the glass paste is positioned between the regions to be joined of the parts and the glass is heated above its melting point so that, on cooling, the required joint is produced. Preferably, the parts are pressed together during the joining operation.

Using the method of the invention, it is also possible to join pairs of porous silicon nitride parts. In this respect, it is to be appreciated that a porous silicon nitride product can be produced, for example, by mixing silicon powder with a temporary binder and then forming the mixture into a body, which is subsequently nitrided. The temporary binder is removed from the body during the nitriding, or at an earlier heating step, and the loss of the binder from the body results in the final silicon nitride product being porous.

Using the glasses described above, joints between pairs of silicon nitride parts have been obtained with modulus of rupture values, measured in each case across the joint, of up to 40,000 p.s.i., the minimum strength of the joint being 10,000 p.s.i.

It is to be appreciated that fusion of the glasses described above can be effected by the use of an oxacetylene torch or any other convenient heating method, instead of by heating the powdered glass in a furnace. It is, however, to be noted that where joining of a pair of silicon nitride parts involves heating a suitable powdered glass above 1350°C, then it is preferable that the heating is effected in an atmosphere inert to the silicon nitride, such as pure nitrogen or argon, so that any tendency for the silicon nitride to oxidise is prevented. Care also must be taken to ensure that the glass is not reduced.

Also, it is to be understood that in forming each of the glasses described above, it is not essential to fuse a mixture of the metal oxides which are to compose the glass. The material which is fused into the glass could alternatively be composed of compounds of the relevant metals which at the fusion temperature would provide the necessary constituents of the glass. Thus, for example, to produce a glass containing silica, alumina, and magnesium oxide, it is possible to fuse a mixture containing ethyl silicate, magnesium carbonate and aluminium hydroxide, or alternatively a mixture containing clinoenstatite ($MgOSiO_2$) and aluminium hydroxide. Further certain spinels, i.e., compounds of magnesium oxide and alumina, and certain mullites, i.e., compounds of silica and alumina, can be used to provide constituents of suitable glass forming mixtures. In addition, cordierite, a compound having the composition $2MgO.2Al_2O_3.5SiO_2$, can be fused directly into a glass suitable for use in the method of the invention.

What is claimed is:

1. A method of joining a pair of silicon nitride parts comprising the steps of:
   a. providing on at least one of the parts to be joined a powdered glass consisting of between 50 and 80 percent by weight silica, between 10 and 40 percent by weight alumina, and between 10 and 25 percent by weight magnesium oxide, and
   b. heating the powdered glass so as to produce molten glass between the parts whereby, on cooling, the glass provides a joint between the parts.

2. A method of joining a pair of silicon nitride parts comprising the steps of:
   a. providing on at least one of the parts to be joined a powdered glass consisting of between 15 and 63 percent by weight silica, between 11 and 53 percent by weight alumina, and between 11 and 50 percent by weight calcium oxide, and
   b. heating the powdered glass so as to produce molten glass between the parts whereby, on cooling, the glass provides a joint between the parts.

3. A method of joining a pair of silicon nitride parts comprising the steps of:
   a. providing on at least one of the parts to be joined a powdered glass consisting of between 27 and 50 percent by weight silica, between 5 and 38 percent by weight alumina, and between 25 and 70 percent by weight strontium oxide, and
   b. heating the powdered glass so as to produce molten glass between the parts whereby, on cooling the glass provides a joint between the parts.

4. A method of joining a pair of silicon nitride parts comprising the steps of:
   a. providing on at least one of the parts to be joined a powdered glass consisting of between 18 and 50 percent by weight silica, between 10 and 37 percent by weight alumina, and between 30 and 65 percent by weight barium oxide, and
   b. heating the powdered glass so as to produce molten glass between the parts whereby, on cooling the glass provides a joint between the parts.

* * * * *